(12) United States Patent
Chen et al.

(10) Patent No.: US 7,778,347 B2
(45) Date of Patent: Aug. 17, 2010

(54) POWER DE-RATING REDUCTION IN A TRANSMITTER

(75) Inventors: Ning Chen, Austin, TX (US); Jeffrey Keating, Austin, TX (US); Stephen C. Ma, Austin, TX (US); James W. McCoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 972 days.

(21) Appl. No.: 11/465,976

(22) Filed: Aug. 21, 2006

(65) Prior Publication Data

US 2008/0043877 A1 Feb. 21, 2008

(51) Int. Cl.
*H04L 27/00* (2006.01)
(52) U.S. Cl. .................. 375/295; 375/254; 375/278; 375/296; 375/297
(58) Field of Classification Search .............. 375/295, 375/254, 260, 261, 278, 296, 297
See application file for complete search history.

(56) References Cited

U.S. PATENT DOCUMENTS

2004/0165524 A1* 8/2004 Chen et al. ............. 370/208
2007/0004465 A1* 1/2007 Papasakellariou et al. ... 455/571
2007/0189151 A1* 8/2007 Pan et al. .................. 370/210

OTHER PUBLICATIONS

J. Armstrong, "Peak-to-average power reduction for OFDM by repeated clipping and frequency domain filtering", Electronic Letters, Feb. 28, 2002, p. 246-247, vol. 38, No. 5, IEEE 2002, Bundoora, Victoria, Australia.
Khaled, N adia et al; "Quantized Multi-Mode Precoding for Spatial Multiplexing MIMO-OFDM Systems"; 2005; pp. 867-871; IEEE.

* cited by examiner

*Primary Examiner*—Shuwang Liu
*Assistant Examiner*—Kabir A Timory
(74) *Attorney, Agent, or Firm*—Dillon & Yudell LLP (57) ABSTRACT

A wireless transmitter is configured to map N first samples of a first discrete Fourier transform (DFT) of a group of coded symbols to M sub-carriers according to a first sub-carrier mapping rule. In this case, M is greater than N. The wireless transmitter is also configure to perform a first inverse DFT (IDFT) on the M sub-carriers to provide M second samples and clip the M second samples according to a clipping rule to provide M third samples. The wireless transmitter is further configured to perform a second DFT on the M third samples, de-map the M third samples to N fourth samples, and map the N fourth samples to O subcarriers according to a predetermined second subcarrier mapping rule. In this case, O is greater than or equal to M.

15 Claims, 6 Drawing Sheets

POWER DE-RATING REDUCTION IN A TRANSMITTER

BACKGROUND OF THE INVENTION

1. Field of the Invention

The present invention is generally directed to a method and system for power de-rating reduction and, more specifically, to a method and system for power de-rating reduction in a transmitter.

2. Description of the Related Art

In general, coded orthogonal frequency division multiplexing (COFDM) systems support high data rate wireless transmission using orthogonal channels, which offer immunity against fading and inter-symbol interference (ISI) without requiring implementation of elaborate equalization techniques. Typically, COFDM systems split data into N streams, which are independently modulated on parallel spaced sub-carrier frequencies or tones. The frequency separation between sub-carriers is 1/T, where T is the COFDM symbol time duration. Each symbol may include a guard interval (or cyclic prefix) to maintain the orthogonality of the symbols. In general, COFDM systems have utilized an inverse discrete Fourier transform (IDFT) to generate a sampled (or discrete) composite time-domain signal. One undesirable attribute of COFDM systems is that they may exhibit relatively large peak-to-average power ratio (PAR), when signals from different sub-carriers add constructively. A large PAR (and/or large cubic metric (CM)) is undesirable as it requires a large dynamic range for a digital-to-analog (D/A) converter implemented within a transmitter of a COFDM system. Consequently, the converter may be used inefficiently as most sub-carrier amplitudes use a fraction of the range of the converter.

In a typical implementation, the output of the D/A converter is filtered before being applied to a power amplifier. As power amplifiers tend to be non-linear, in-band distortion and spectral spreading (or spectral regrowth) may occur. As is known, spectral regrowth may occur when a band-limited time-varying (non-constant) envelope signal is passed through a non-linear circuit. One technique for addressing non-linearity of a power amplifier has operated the power amplifier at a relatively large output power backoff (OBO). Unfortunately, operating a power amplifier at a relatively large OBO (or power de-rating) reduces the power efficiency of the amplifier. For example, at a 6 dB OBO, a power amplifier may exhibit a fifty percent (or more) loss in efficiency. To reduce the PAR and/or CM of COFDM systems, various designers have also implemented or proposed hard limiting (or clipping) directly on the signal to be transmitted. Unfortunately, directly clipping the signal to be transmitted may cause undesirable spectral regrowth and inter-user interference (or inter-carrier interference (ICI)) in systems that utilize multiple access mode.

Discrete Fourier transform-spread orthogonal frequency division multiplexing (DFT-SOFDM) has been proposed as the modulation technique for the uplink of evolved-universal terrestrial radio access (E-UTRA). Single carrier transmission schemes, such as DFT-SOFDM, generally facilitate further power de-rating reduction through the use of, for example, specific modulation or coding schemes, or clipping and spectral filtering of a signal to be transmitted. Moreover, the PAR and CM of a basic DFT-SOFDM (or single carrier-frequency division multiple access (SC-FDMA)) system is generally reduced, as compared to the PAR and CM of a basic COFDM system. To further reduce the PAR and CM of basic DFT-SOFDM transmitters, it has been proposed to pre-process an input signal prior to performing a fast Fourier transform (FFT) on a group of symbols associated with the input signal. Following this approach, selected input symbols and/or bits may be attenuated in order to reduce the PAR and CM at the output of an inverse fast Fourier transform (IFFT) of the DFT-SOFDM system.

Figure 1:
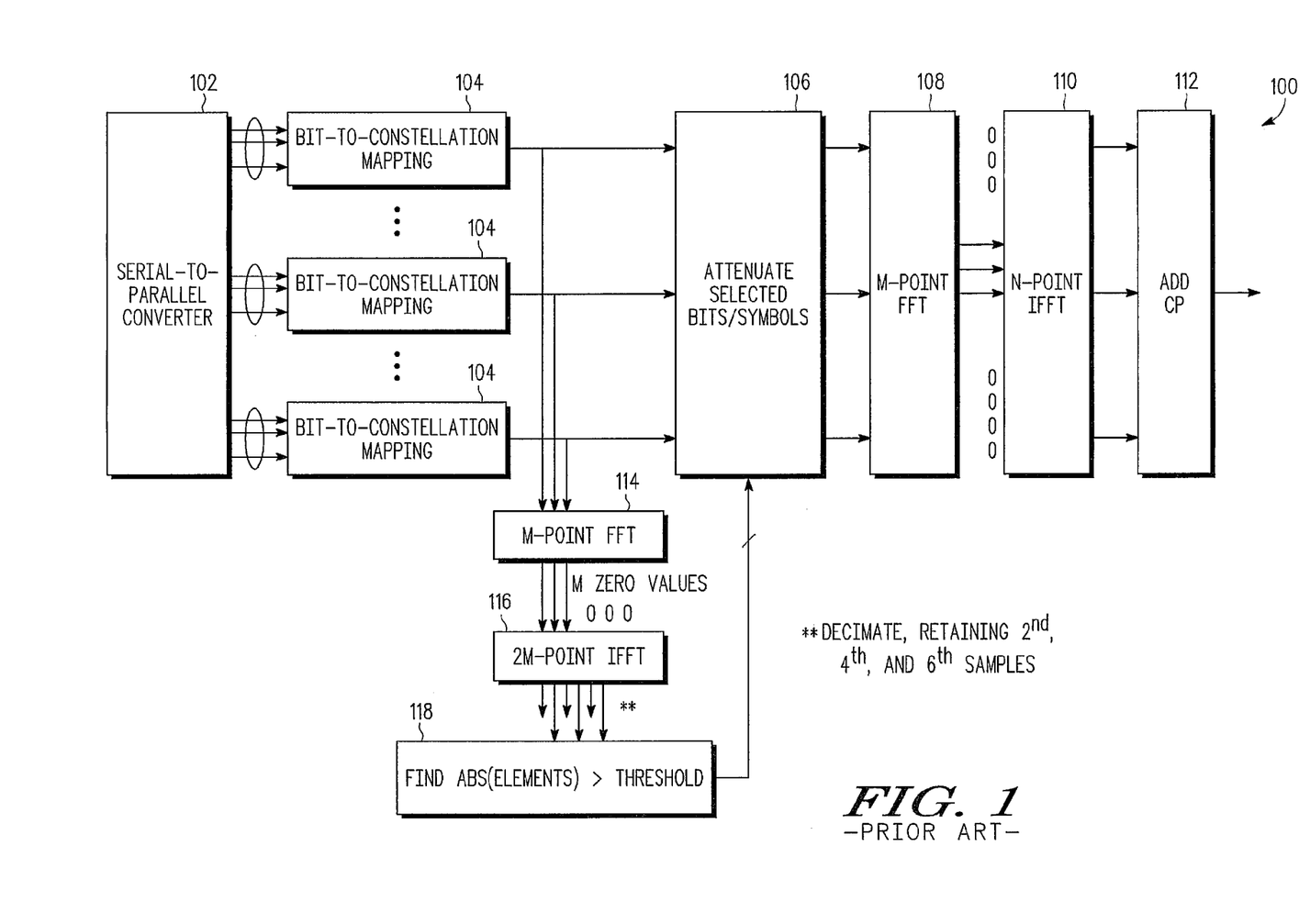
FIG. 1 is a block diagram of a relevant portion of a prior art system that implements power de-rating reduction by pre-processing an input signal provided to inputs of an M-point fast Fourier transform (FFT) of a single carrier-frequency division multiple access (SC-FDMA) transmitter.

FIG. 1 depicts a relevant portion of a prior art SC-FDMA system 100 that implements, for example, a quadrature phase shift keying (QPSK) modulation scheme. As is shown, data from a serial-to-parallel converter 102 is applied to a plurality of bit-to-constellation mapping blocks 104, which mapped the data bits to IQ bits. For example, in a system that implements a QPSK modulation scheme, each group of twenty bits would be mapped to a group of ten symbols, i.e., two bits per symbol. As another example, in a system implementing an 8-QSPK modulation scheme, each group of thirty bits would be mapped to a group of ten symbols, i.e., three bits per symbol. In the system 100 of FIG. 1, outputs of the mapping blocks 104 are provided to inputs of an M-point fast Fourier transform (FFT) block 114 and to inputs of an attenuator block 106. Outputs of the M-point FFT 114 and M-zero values are also provided to inputs of a 2M-point inverse FFT (IFFT) block 116. Selected outputs of the 2M-point IFFT block 116 are provided to a peak detector 118.

As is shown in FIG. 1, outputs of the peak detector 118 are provided to control inputs of the attenuator block 106, which attenuates selected bits (or symbols) a desired amount according to signals provided at the control inputs of the attenuator block 106. Outputs of the attenuator block 106 are provided to a conventional SC-FDMA transmitter (including an M-point FFT block 108, an N-point IFFT block 110 and a cyclic prefix (CP) block 112, which adds a desired guard band to each symbol group). It should be noted that the sub-carrier mapping block that maps the samples of the M-point FFT to N sub-carriers (in a localized or distributed manner) is not separately shown in FIG. 1. While the system 100 exhibits improved power de-rating reduction over conventional SC-FDMA systems, it would be desirable to provide further power de-rating reduction than can be readily achieved by the system 100 of FIG. 1. What is needed is a technique for power de-rating reduction for a transmitter (e.g., an uplink transmitter) that further reduces inter-carrier interference and spectral regrowth.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices and systems such as base stations, portable digital assistants, digital cameras, portable storage devices, audio players and portable gaming devices, for example.

According to various aspects of preferred embodiments, a transmitter structure is disclosed that generally may exhibit improved power de-rating reduction, which generally may improve the power efficiency of non-constant envelop communications systems. The transmitter structure may be advantageously implemented within a single carrier transmission scheme, such as systems that implement a single carrier-frequency division multiple access (SC-FDMA) uplink transmission scheme, which has been proposed as the uplink for third generation partnership project long term evolution (3GPP LTE). Implementing an SC-FDMA uplink scheme may allow for a high degree of commonality in systems that also employ a downlink coded orthogonal frequency division multiplexing (COFDM) transmission scheme, as certain parameters, e.g., clock frequency, can be reused.

Figure 2:
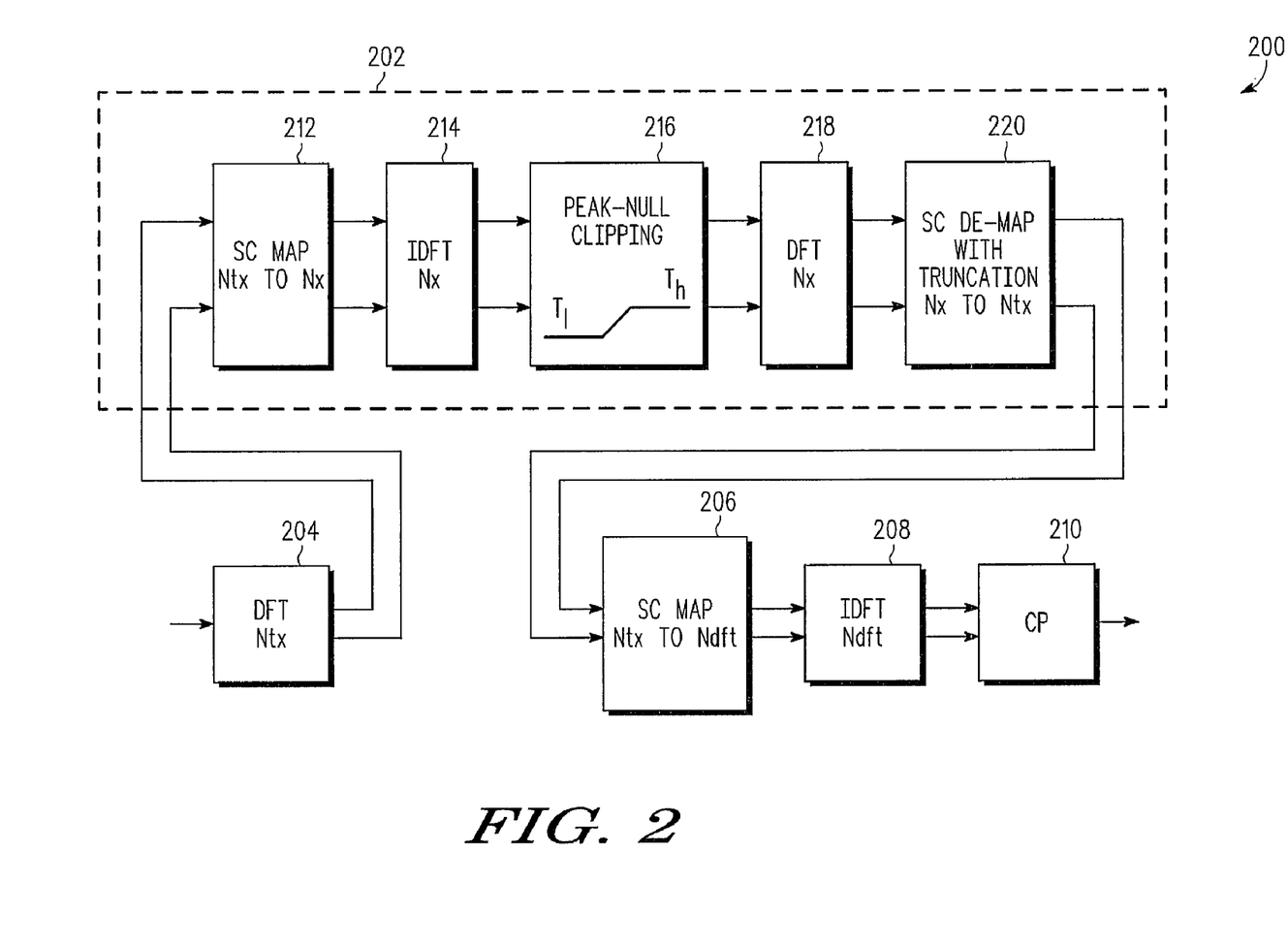
FIG. 2 is a block diagram of a relevant portion of an exemplary system, configured according to an embodiment of the present invention, that implements power de-rating reduction for a single carrier transmitter.

With reference to FIG. 2, a relevant portion of an SC-FDMA system 200 is depicted that includes a transmission structure 202, configured according to one embodiment of the present invention. In alternative embodiments, system 200 may be implemented in software, hardware or a combination of hardware and software. In the illustrated embodiment, the structure 202 is located between a conventional discrete Fourier transform (DFT) block 204 and a conventional sub-carrier (SC) map block. The DFT block 204, the SC map block 206, an inverse discrete Fourier transform (IDFT) block 208 and a cyclic prefix (CP) block 210 may be essentially identical with similar blocks of a conventional SC-FDMA transmitter. As is illustrated in the embodiment shown in FIG. 2, the structure 202 includes an SC map block 212, an IDFT block 214, a peak-null clipping block 216, a DFT block 218 and an SC De-map with truncation block 220. According to one embodiment, the DFT block 204 is used to calculate the FFT of a group of symbols. It should, however, be appreciated that the DFTs employed are not limited to FFTs. In a system implementing a QPSK modulation scheme, twenty bits may be mapped to ten symbols. In this case, the DFT block 204 performs a DFT on a group of ten symbols to provide Ntx=10 samples. Ntx may correspond to, for example, integer multiples of twenty-five in a 3GPP LTE uplink.

The SC map block 212 maps the Ntx samples onto Nx sub-carriers (SCs), according to a predetermined mapping rule. For example, the Ntx samples may be mapped onto one-hundred fifty sub-carriers. The IDFT block 214 then provides an Nx-point IDFT, or Nx-point discrete time-domain samples, for each symbol group. The peak-null clipper then clips the peak and the null of non-threshold compliant ones of the Nx-point IDFTs, according to a predetermined rule. For example, the peak may be limited to a first desired value when a magnitude of the peak exceeds a high threshold (Th) and the null may be limited to a second desired value when a magnitude of the null is below a low threshold (Tl). The thresholds Th and Tl may be set, for example, based on an error vector magnitude (EVM) requirement. Assuming that neither the peak or null thresholds are exceeded the sample would typically remain unchanged. Alternatively, either a peak or null of a sample alone may be modified to effect a change in peak-to-average power ratio (PAR) and/or cubic metric (CM). The DFT block 218 then provides an Nx-point DFT, e.g., an Nx-point FFT, of the clipped samples.

The SC map block 220 then de-maps the Nx samples onto Ntx sub-carriers using, for example, truncation. This ensures that out-of-band distortion is removed from the samples. Following the de-mapping, the SC map block 206 maps the Ntx sub-carriers to Ndft sub-carriers. For example, the seventy-five de-mapped samples may be mapped to one-thousand twenty-four sub-carriers. It should be appreciated that the sub-carriers may be mapped in a localized or distributed (or interleaved) manner. The IDFT block 208 then provides an Ndft-point IDFT of the mapped Ndft sub-carriers. The CP block 210 then adds an appropriate CP to the Ndft-point IFFT to provide a desired guard interval for each symbol group. The resultant digital signal may then be converted to an analog signal, which is then power amplified prior to transmission.

Figure 3:
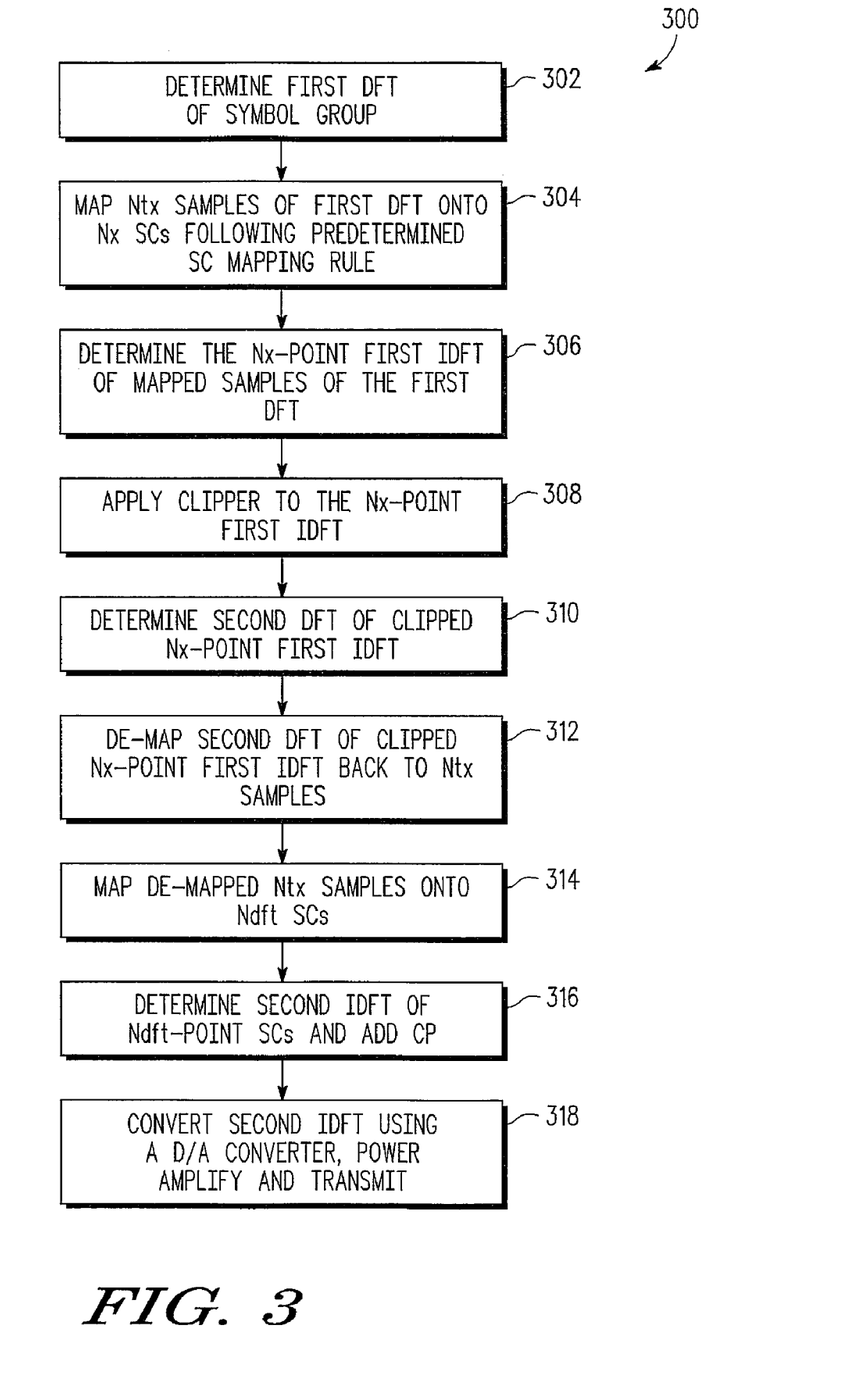
FIG. 3 is a flowchart describing an implementation of the system of FIG. 2.

With reference to FIG. 3, a flowchart of an exemplary process 300 for power de-rating reduction in a transmitter, e.g., an uplink transmitter, according to an embodiment of the present invention, is depicted. It should be appreciated that, in alternative preferred embodiments, the process 300 may be implemented by functionality of hardware components, e.g., an integrated circuit or performed by a processor, e.g., a digital signal processor (DSP), executing appropriate code. Initially, in block 302, a first DFT (i.e., a conventional DFT) of a group of symbols is determined. For example, an Ntx-point FFT of the symbol group may be calculated. Next, in block 304, the Ntx samples provided by the DFT are mapped onto Nx subcarriers following a predetermined sub-carrier (SC) mapping rule. In this case, Nx may be the size of a first IDFT. For example, Ntx may be set to seventy-five and Nx may be set to one-hundred fifty. It should be appreciated that other values for Ntx and Nx may be utilized. To provide up-sampling, it is, however, desirable for Nx to be greater than Ntx. Then, in block 306, a Nx-point first IDFT of the mapped first DFT is determined. Next, in block 308, a peak-null clipper is applied to each of the Nx-points of the first IDFT. As briefly discussed above, it is envisioned that either the peak, null, or both the peak and the null (or neither the peak or null in compliant samples) of a non-compliant sample may be clipped according to various embodiments of the present invention. As noted above, clipping both the peak and null will generally reduce PAR and CM.

In block 310, a second DFT of the clipped Nx-point IDFT is determined. Then, in block 312 the second DFT of the clipped Nx-point first IDFT is de-mapped back to Ntx samples to remove out-of-band distortion. Next, in mapping block 314, the de-mapped Ntx samples are mapped onto Ndft sub-carriers (SCs), where Ndft is the size of a second IDFT (i.e., the conventional IDFT). In various embodiments, the value of Nx may be less than or equal to the value of Ndft. Then, in block 316 the second IDFT of the Ndft-point SCs is determined and an appropriate cyclic prefix (CP) is added for each symbol group. Finally, in block 318, the second IDFT (including the CP) is converted from a digital signal to an analog signal and the resultant analog signal is amplified for transmission. As noted above, according to one or more embodiments, the upper or higher threshold (Th) and the lower threshold (Tl) of the clipper may be set according to a desired error vector magnitude (EVM) requirement.

A mathematical description of an exemplary process 300 is as follows. The notations for the process are:

$N_{TX}$, size of FFT
$N_{FFT}$, size of IFFT
$N_X$, size of proposed FFT/IFFT
$T_h$, the upper threshold of the clipper
$T_l$, the lower threshold of the clipper
s[n], the nth OFDM symbol, $0 \leq n \leq N_{TX}-1$
S[k], the FFT of s[n], $0 \leq k \leq N_{TX}-1$
š[n], $N_X$ point IFFT of S[k], $0 \leq k \leq N_X-1$
s̄[n], s[n] clipped by the peak-null clipper
S̄[k], the FFT of s̄[n], $0 \leq k \leq N_X-1$
X[k], the de-mapped $N_{TX}$ subcarriers from S̄[k]
x[n], $N_{FFT}$-point IFFT of X[k].

At an initialization step of process 300, proper upper ($T_h$) and lower ($T_l$) thresholds per error vector magnitude (EVM) requirement are set. Thereafter, the process proceeds as follows:

1. Calculate S[k]=FFT{s[n]}, $0 \leq k \leq N_{TX}-1$.
2. Map the $N_{TX}$ samples of S[k] onto $N_X$ subcarriers following the predetermined SC mapping rule.
3. Calculate š[n]=IFFT{S[k]}, $0 \leq k \leq N_X-1$.
4. Apply the peak-null clipper on š[n] as:

$$\bar{s}[n] = \begin{cases} T_h \exp\{j\angle\tilde{s}[n]\}, & |\tilde{s}[n]| > T_h \\ T_l \exp\{j\angle\tilde{s}[n]\}, & |\tilde{s}[n]| < T_l \\ \tilde{s}[n], & \text{else.} \end{cases}$$

5. Calculate S̄[k]=FFT{s[n]}, $0 \leq k \leq N_X-1$.
6. De-map the $N_X$ samples of S̄[k] into X[k] with $N_{TX}$ samples using truncation.
7. Map X[k] onto $N_{FFT}$ subcarriers in either localized or interleaved manner.
8. Calculate x[n]=IFFT{X[k]} and add the cyclic prefix.
9. Send x[n] through D/A and power amplifier before transmission.

Figure 4:
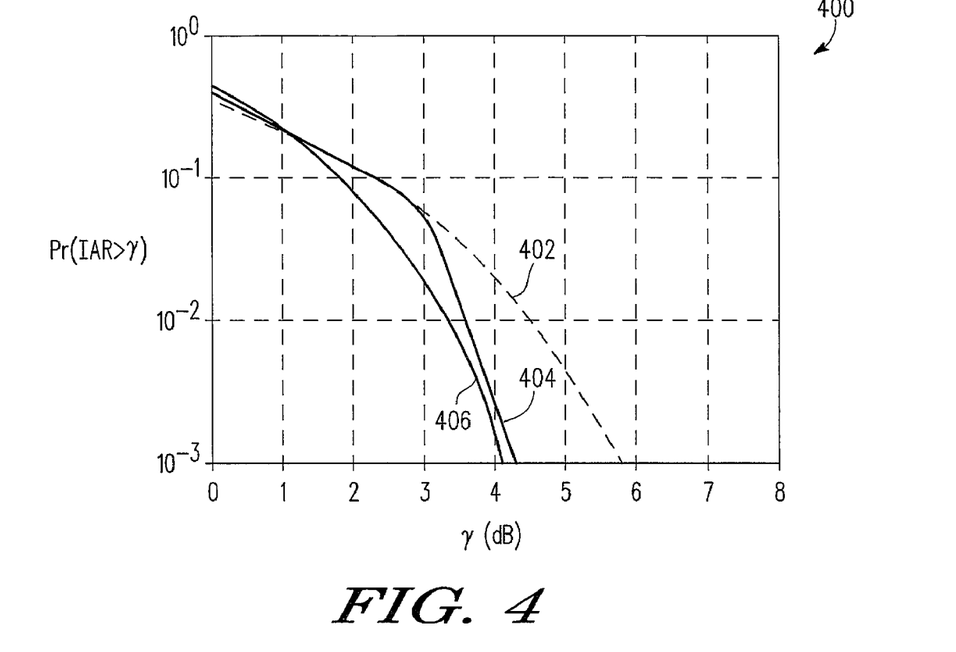
FIG. 4 is a graph including simulation curves that plot power de-rating reduction for three different SC-FDMA systems employing quadrature phase shift keying (QPSK) modulation.

FIG. 4 depicts a graph 400 that includes simulation curves 402, 404 and 406 which plot a probability that an instantaneous-to-average power ratio (IAR) is greater than a threshold (γ) versus the threshold (γ) for SC-FDMA systems employing a quadrature phase shift keying (QPSK) modulation scheme. The simulation curves 402, 404 and 406 (which correspond to a conventional SC-FDMA system, the system of FIG. 1 and the system of FIG. 2, respectively) have a cubic metric (CM) of 1.218 dB, 0.795 dB and 0.427 dB, respectively. As is illustrated, the SC-FDMA system designed according to an embodiment of the present invention (curve 406) exhibits almost twice the power de-rating reduction of the system of FIG. 1 (curve 404) for QPSK modulation.

Figure 5:
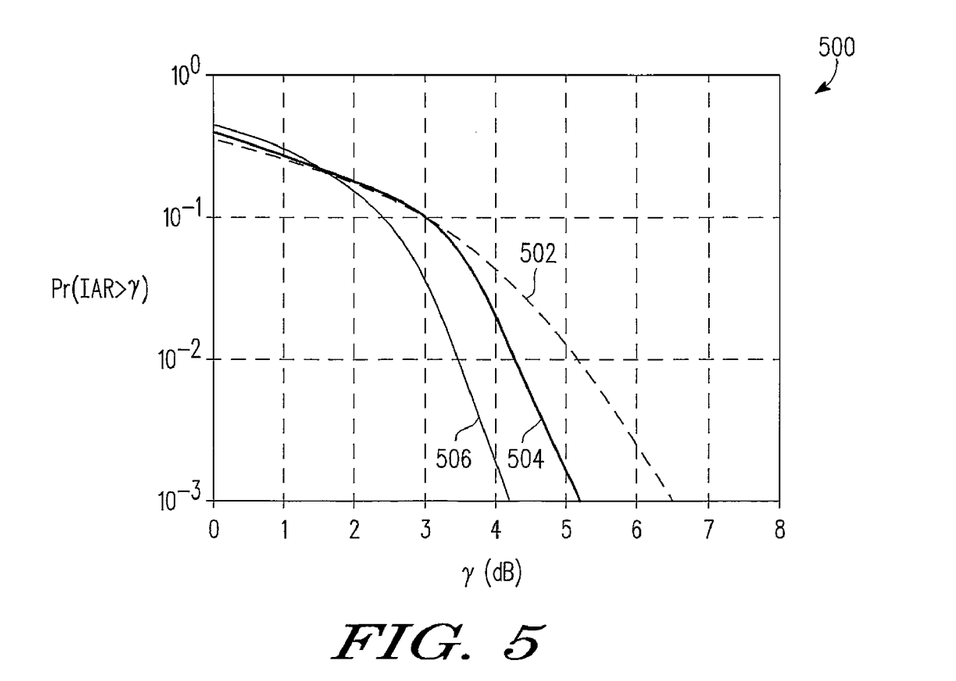
FIG. 5 is a graph including simulation curves that plot power de-rating reduction for three different SC-FDMA systems employing 16-quadrature amplitude modulation (16-QAM).

FIG. 5 depicts a graph 500 that includes simulation curves 502, 504 and 506 which plot a probability that an instantaneous-to-average power ratio (IAR) is greater than a threshold (γ) versus the threshold (γ) for a 16-quadrature amplitude modulation (16-QAM) system. The simulation curves 502, 504 and 506 (which correspond to a conventional SC-FDMA system, the system of FIG. 1 and the system of FIG. 2, respectively) have a cubic metric (CM) of 2.10 dB, 1.62 dB and 0.92 dB, respectively. As is illustrated, the SC-FDMA system designed according to an embodiment of the present invention (curve 506) exhibits almost twice the power de-rating reduction of the system of FIG. 1 (curve 504) for 16-QAM modulation.

Figure 6:
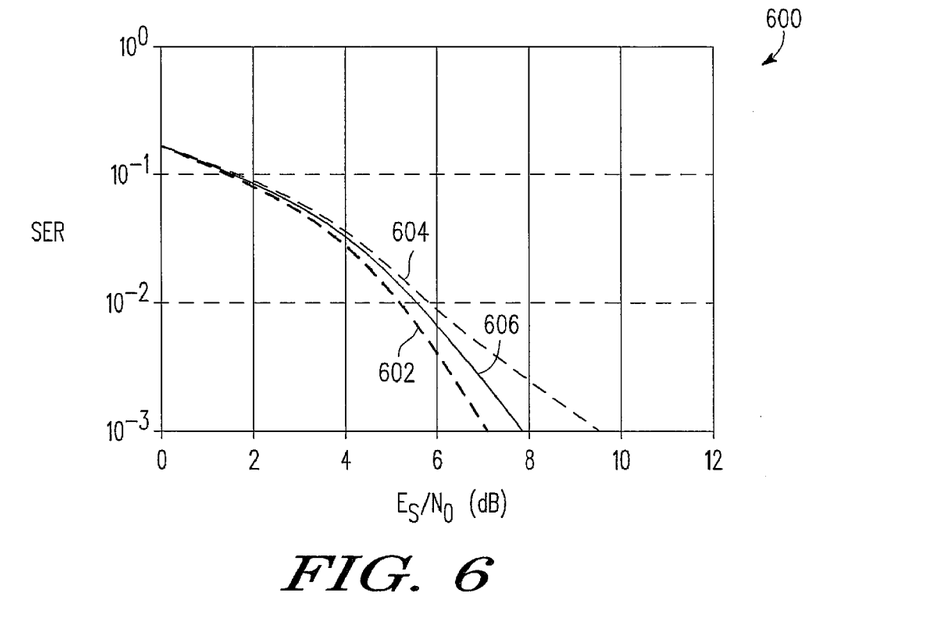
FIG. 6 is a graph including simulation curves that plot symbol error rate (SER) versus symbol energy/noise for three different SC-FDMA systems employing QPSK modulation.

FIG. 6 depicts a graph 600 that includes simulation curves 602, 604 and 606 which plot symbol error rate (SER) versus symbol energy ($E_S$)/noise ($N_0$) for SC-FDMA systems employing quadrature phase shift keying (QPSK) modulation. The simulation curves 602, 604 and 606 (which correspond to a conventional SC-FDMA system, the system of FIG. 1 and the system of FIG. 2, respectively) illustrate that the system of FIG. 2, which is configured according to the present invention, exhibits a smaller error rate than the prior art system of FIG. 1.

Figure 7:
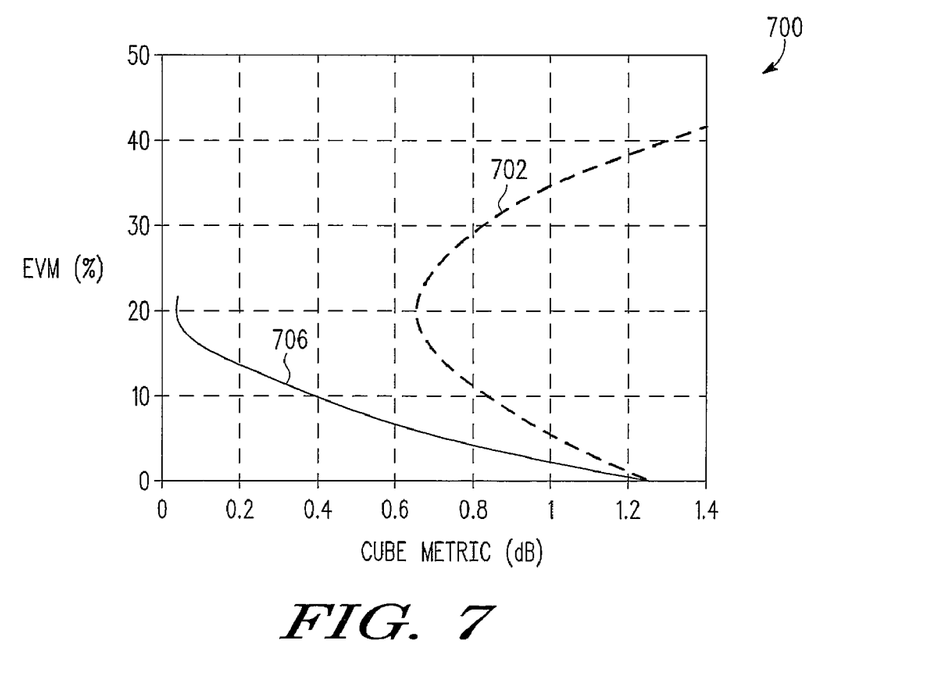
FIG. 7 is a graph including simulation curves that plot percent error vector magnitude (EVM) versus cubic metric (CM) for an SC-FDMA system designed according to an embodiment of the present invention and the prior art system of FIG. 1.

FIG. 7 depicts a graph 700 that includes curves 702 and 706 which plot percent error vector magnitude (EVM) versus cubic metric (CM) for the prior art system of FIG. 1 and the system of FIG. 2 designed according to an embodiment of the present invention, respectively. As is illustrated by the curves 702 and 706, the system of FIG. 2 exhibits a power de-rating reduction and EVM that are superior to that of the prior art system of FIG. 1.

Figure 8:
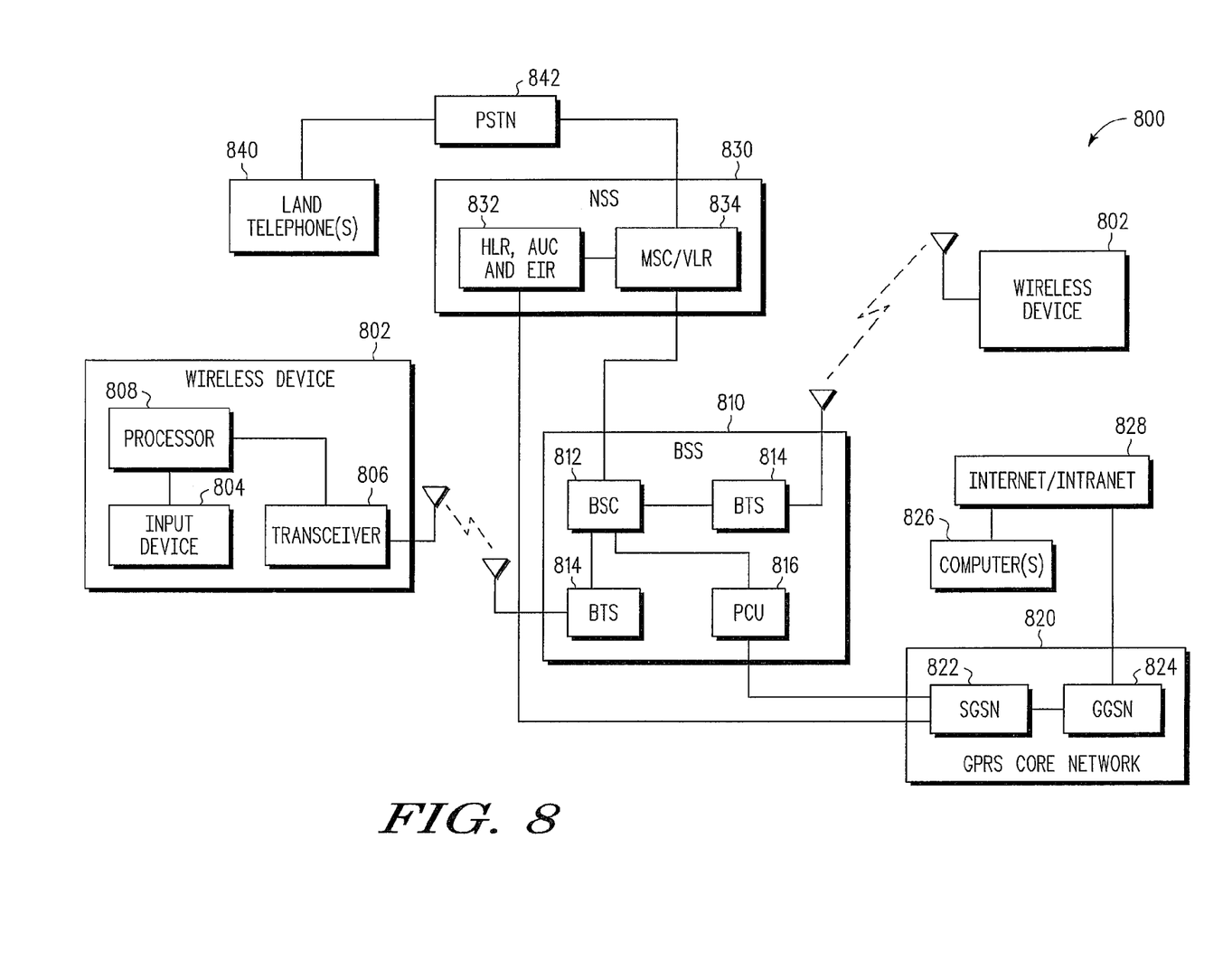
FIG. 8 is a block diagram of an exemplary wireless communication system that may implement a transmitter within a wireless device that is configured according to various embodiments of the present invention.

With reference to FIG. 8, an exemplary wireless communication system 800 is depicted that includes a plurality of wireless devices 802, e.g., hand-held computers, personal digital assistants (PDAs), cellular telephones, etc., that may implement communication links according to one or more embodiments of the present invention. In general, the wireless devices 802 include a processor 808 (e.g., a digital signal processor (DSP)), a transceiver 806 and one or more input devices 804 (e.g., a camera, a keypad, etc.), among other components not shown in FIG. 8. As is noted above, according to various embodiments of the present invention, a technique is disclosed that facilitates power de-rating reduction in a transmitter of a wireless communication device, such as the wireless device 802. The wireless devices 802 communicate with a base station controller (BSC) 812 of a base station subsystem (BSS) 810, via one or more base transceiver stations (BTS) 814, to receive or transmit voice and/or data.

The BSC 812 is also in communication with a packet control unit (PCU) 816, which is in communication with a serving general packet radio service (GPRS) support node (SGSN) 822. The SGSN 822 is in communication with a gateway GPRS support node (GGSN) 824, both of which are included within a GPRS core network 820. The GGSN 824 provides access to computer(s) 826 coupled to Internet/intranet 828. In this manner, the wireless device 802 may receive data from and/or transmit data to computers coupled to the Internet/intranet 828. For example, when the device 802 includes a camera, images may be transferred to a computer 826 coupled to the Internet/intranet 828 or to another device 802. The BSC 812 is also in communication with a mobile switching center/visitor location register (MSC/VLR) 834, which is in communication with a home location register (HLR), an authentication center (AUC) and an equipment identity register (EIR) 832. In a typical implementation, the MSC/VLR 834 and the HLR, AUC and EIR 832 are located within a network and switching subsystem (NSS) 830. The SGSN 822 may communicate directly with the HLR, AUC and EIR 832. As is also shown, the MSC/VLR 834 is in communication with a public switched telephone network (PSTN) 842, which facilitates communication between wireless devices 802 and land telephones 840.

As is discussed above, according to various techniques associated with embodiments of the present invention, information is transmitted from a wireless device by initially mapping N first samples of a first discrete Fourier transform (DFT), e.g., a fast Fourier transform (FFT), of a group of coded symbols to M sub-carriers according to a first sub-carrier mapping rule, where M is greater than N. Next, a first inverse DFT (IDFT), e.g., an inverse fast Fourier transform (IFFT), is performed on the M sub-carriers to provide M second samples. Then, the M second samples are clipped (or not) according to a clipping rule to provide M third samples. Next, a second DFT is performed on the M third samples. Then, the M third samples are de-mapped to N fourth samples. Finally, the N fourth samples are mapped to O subcarriers according to a predetermined second subcarrier mapping rule, where O is greater than or equal to M.

According to another aspect of the present invention, the technique also includes performing the first DFT on the group of coded symbols (to provide the N first samples), performing a second IDFT on the O sub-carriers (to provide O fifth samples) and adding a cyclic prefix (CP) to the fifth samples. According to another embodiment, only the M second samples that are greater than a predetermined high threshold are clipped. According to another aspect, only the M second samples that are less than a predetermined low threshold are clipped. The transmitter may be an uplink transmitter that utilizes a single carrier-frequency division multiple access (SC-FDMA) transmission scheme. In this embodiment, the uplink transmitter may implement one of a phase shift keying (PSK), a quadrature amplitude modulation (QAM) or other data modulation scheme. It should be appreciated that any of the various PSK, e.g., pi/2 BPSK, QPSK and 8-PSK, or QAM, e.g., 16-QAM and 64-QAM, modulation techniques may be implemented in a communication system constructed according to the present invention. According to another embodiment, a peak of a respective one of the M second samples is clipped when the peak of the respective one of the M second samples is above a high threshold and a null of a respective one of the M second samples is clipped when a null of the respective one of the M second samples is below a low threshold. According to various embodiments, the first IDFT predicts a time-domain signal and the second DFT smoothes clipping noise. In general, the clipping rule reduces a peak-to-null ratio of a clipped one of the M second samples and, thus, reduces a peak-to-average power ratio (PAR) and cubic metric (CM) of an associated transmitter.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

As will be appreciated, the processes in preferred embodiments of the present invention may be implemented using any combination of computer programming software, firmware or hardware. For example, an article of manufacture containing the computer programming code is used by either executing the code directly from the storage device, by copying the code from the storage device into another storage device such as a hard disk, RAM, etc., or by transmitting the code for remote execution. The method form of the invention may be practiced by combining software and/or hardware to complete the steps of the invention. An apparatus for practicing the invention could be one or more computers and storage systems containing or having network access to computer program(s) coded in accordance with the invention. Alternatively, a system for practicing the invention could be implemented in an application specific integrated circuit.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A method for power de-rating reduction in a transmitter of a wireless communication device, comprising:

mapping N first samples of a first discrete Fourier transform (DFT) of a group of coded symbols to M sub-carriers according to a first predetermined sub-carrier mapping rule, where M is greater than N;

performing a first inverse DFT (IDFT) on the M sub-carriers to provide M second samples;

clipping the M second samples according to a clipping rule to provide M third samples;

performing a second DFT on the M third samples;

de-mapping, following the second DFT, the M third samples to N fourth samples; and mapping the N fourth samples to O sub-carriers according to a predetermined second sub-carrier mapping rule, where O is greater than or equal to M, wherein a peak of a respective one of the M second samples is clipped when the peak of the respective one of the M second samples is above a high threshold, and wherein a null of a respective one of the M second samples is clipped when a null of the respective one of the M second samples is below a low threshold.

2. The method of claim 1, further comprising:
performing the first DFT on the group of coded symbols to provide the N first samples;
performing a second IDFT on the O sub-carriers to provide O fifth samples; and
adding a cyclic prefix to the fifth samples.

3. The method of claim 1, further comprising:
clipping only the M second samples that are greater than a predetermined threshold.

4. The method of claim 1, further comprising:
clipping only the M second samples that are less than a predetermined threshold.

5. The method of claim 1, wherein the transmitter is an uplink transmitter that utilizes a single carrier-frequency division multiple access (SC-FDMA) transmission scheme.

6. The method of claim 5, wherein the uplink transmitter implements one of a phase shift keying (PSK) or a quadrature amplitude modulation (QAM) data modulation scheme.

7. The method of claim 1, wherein the first IDFT predicts a time-domain signal and the second DFT smoothes clipping noise.

8. The method of claim 1, wherein the clipping rule reduces a peak-to-null ratio of a clipped one of the M second samples.

9. A communication device, comprising:
an input device; and
a processor coupled to the input device to receive samples, wherein the processor is programmed to:
map N first samples of a first discrete Fourier transform (DFT) of a group of coded symbols to M sub-carriers according to a first sub-carrier mapping rule, where M is greater than N;
perform a first inverse DFT (IDFT) on the M sub-carriers to provide M second samples;
clip the M second samples according to a clipping rule to provide M third samples;
perform a second DFT on the M third samples;
de-map, following the second DFT, the M third samples to N fourth samples; and
map the N fourth samples to O sub-carriers according to a predetermined second sub-carrier mapping rule, where O is greater than or equal to M, wherein a peak of a respective one of the M second samples is clipped when the peak of the respective one of the M second samples is above a high threshold, and wherein a null of a respective one of the M second samples is clipped when a null of the respective one of the M second samples is below a low threshold.

10. The communication device of claim 9, wherein the processor is further programmed to:

perform the first DFT on the group of coded symbols to provide the N first samples;
perform a second IDFT on the O sub-carriers to provide O fifth samples;
add a cyclic prefix to the fifth samples to provide a discrete time-domain signal for transmission; and
convert the discrete time-domain signal to an analog signal for transmission.

11. The communication device of claim 10, wherein the communication device utilizes a single carrier-frequency division multiple access (SC-FDMA) transmission scheme for transmission of the analog signal.

12. The communication device of claim 11, wherein the communication device implements one of a phase shift keying (PSK) or a quadrature amplitude modulation (QAM) data modulation scheme.

13. The communication device of claim 9, wherein the clipping rule reduces a peak-to-null ratio of a clipped one of the M second samples.

14. A system comprising:
a transmitter configured to transmit signals, wherein the transmitter includes:
a mapping module that maps N first samples of a first discrete Fourier transform (DFT) of a group of coded symbols to M sub-carriers according to a first predetermined sub-carrier mapping rule, where M is greater than N;
a first transform module that performs a first inverse DFT (IDFT) on the M sub-carriers to provide M second samples;
a clipping module that clips the M second samples according to a clipping rule to provide M third samples;
a second transform module that performs a second DFT on the M third samples;
a de-mapping module that de-maps, following the second DFT, the M third samples to N fourth samples; and
a second mapping module that maps the N fourth samples to O sub-carriers according to a predetermined second sub-carrier mapping rule, where O is greater than or equal to M, wherein a peak of a respective one of the M second samples is clipped when the peak of the respective one of the M second samples is above a high threshold, and wherein a null of a respective one of the M second samples is clipped when a null of the respective one of the M second samples is below a low threshold.

15. The system of claim 14, wherein the transmitter is further configured to:
perform the first DFT on the group of coded symbols to provide the N first samples;
perform a second IDFT on the O sub-carriers to provide O fifth samples; and
add a cyclic prefix to the fifth samples.

* * * * *